July 8, 1941.  A. D. BELL, JR  2,248,329
VENTILATING ATTACHMENT FOR VEHICLES
Filed Oct. 10, 1938
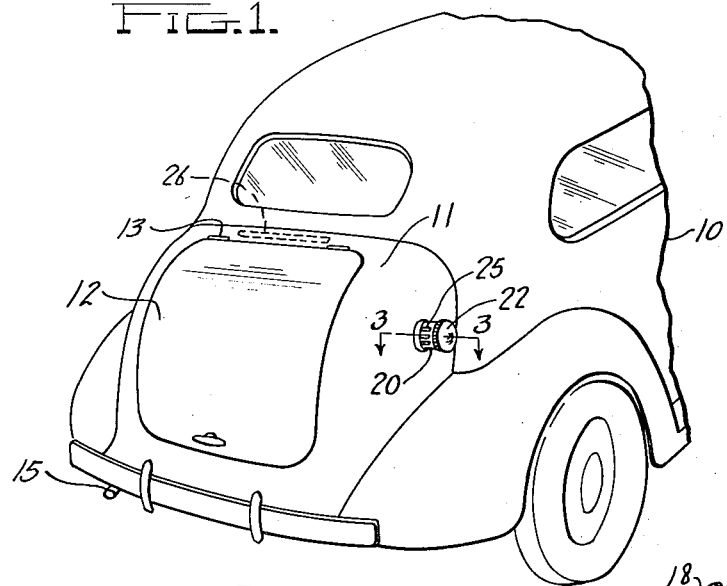
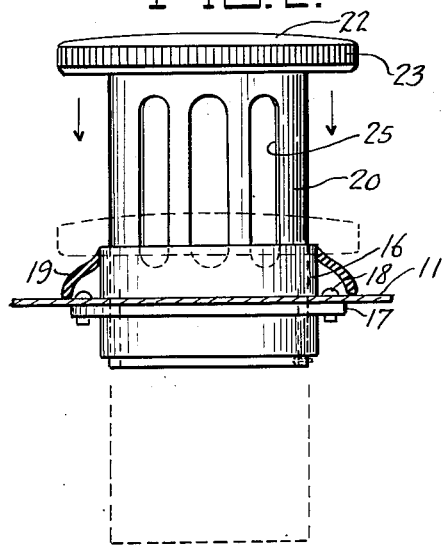
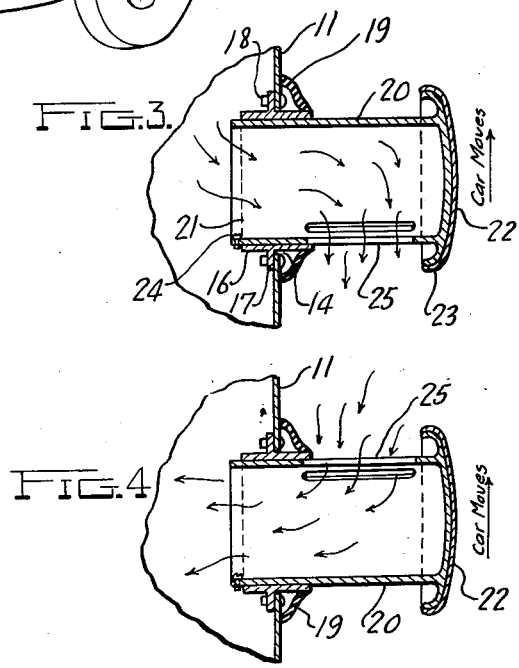
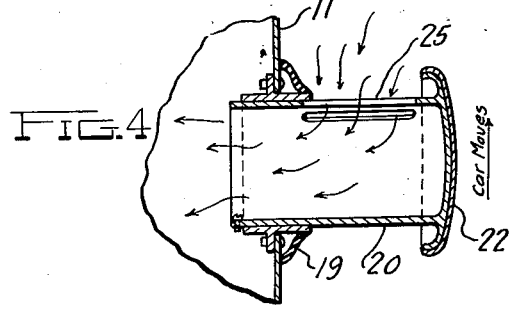
Inventor
Archiebald D. Bell Jr.
By Malcolm W. Fraser
Attorney Patented July 8, 1941

2,248,329

UNITED STATES PATENT OFFICE 2,248,329

VENTILATING ATTACHMENT FOR VEHICLES

Archiebald D. Bell, Jr., Toledo, Ohio

Application October 10, 1938, Serial No. 234,124

1 Claim. (Cl. 98—2)

This invention relates to ventilators for vehicles but more particularly to a ventilating device for the rear trunk compartment of automobiles and an object is to produce a new and improved device of this character which enables fresh air to be forced into the compartment or the foul air and gases withdrawn therefrom; which can be readily and conveniently installed on automobiles without defacing or detracting from the appearance thereof; and which is effective also in drawing air from the inside of the vehicle body thereby assisting in the ventilation thereof.

For purposes of illustration but not of limitation, an embodiment of the invention is shown on the accompanying drawing in which—

Figure 1 is a perspective view of the rear end of an automobile showing the ventilator attached to the rear trunk compartment thereof;

Figure 2 is an enlarged elevation of the ventilator showing in section a portion of the body panel to which the same is applied;

Figure 3 is a transverse sectional view substantially on the line 3—3 of Figure 1 showing the ventilator turned to the position to exhaust air from the inside of the trunk compartment; and Figure 4 is a view similar to Figure 3 but showing the ventilator turned to the position to direct air to the inside of the trunk compartment.

The illustrated embodiment of the invention comprises an automobile 10 of the closed body type having a rear trunk compartment 11 having the usual door 12 hinged at its upper end at 13. It will be understood by those skilled in this art that automobiles as presently constructed are ordinarily provided with a trunk compartment of this character and by opening the door 12, a fairly sizable chamber is provided for receiving suitcases, parcels or other baggage and oftentimes the spare tire.

The opening 14 is cut in the side panel of the compartment 11 on the side remote from the exhaust pipe 15 of the automobile. Disposed within this opening and having a portion extending outside of the compartment and another portion inside of the compartment is a sleeve 16 having an annular flange 17 abutting against the inside of the body panel and secured thereto by bolts and nuts 18. Covering the bolt head and providing for a more finished appearance is a rubber gasket or escutcheon 19.

Having a fairly tight fit inside of the sleeve 16 is a metal tube 20 having an open inner end 21 and a closed outer end 22, the latter having an annular knurled skirt 23 which when the sleeve is pushed inwardly to closed position, abuts against the outer end of the sleeve 16 to close the opening. The closed outer end 22 with its skirt 23 provides in effect a cap which may be chromium plated or painted to match the body of the vehicle so as not to detract from the appearance thereof.

A stop screw 24 on the inner end of the tube 20 abuts against the inner end of the sleeve 16 and provides a stop for limiting the outward movement of the tube. Formed in the side walls of the tube 20 are a series of elongate apertures 25 which when the tube is pulled outwardly to its limited movement are adapted when the tube is turned to one position (Figure 3) to exhaust air from the inside of the compartment when the vehicle is in motion. It will be understood that when the apertures 25 face rearwardly of the vehicle, the air stream passing over the tube during the forward motion of the vehicle creates a suction drawing air from the inside of the compartment 11. However, when the tube 20 is turned to the position shown in Figure 4 with the apertures or slots 25 facing forwardly into the air stream, air is forced or deflected to the inside of the compartment 11. The frictional engagement between the tube 20 and the sleeve 16 is sufficient to retain the tube in its adjusted position.

By providing a slit or opening 26 in the front wall of the compartment 11 so that it opens to the inside of the body, the air from the inside of the body may be withdrawn therefrom when the tube 20 is disposed in the position shown in Figure 3. This is of advantage in that it operates not only to ventilate the trunk compartment 11 but also to assist in ventilating the vehicle body and in cold weather when the automobile heater is in operation would assist in drawing the heat to the rear portion of the automobile body as well as heating the trunk compartment 11.

A device of the above character enables the trunk compartment 11 to be used in the transporting of animals such as dogs, adequate ventilation being provided. Also in view of the above structure, the compartment is sufficiently warm in cold weather to make it comfortable for animals. A ventilator of this character also enables the trunk compartment to be used for carrying groceries, picnic lunches, beverages, etc., inasmuch as adequate fresh air is supplied to the compartment.

It will be understood that when not in use, the tube is pushed in so that all that is visible from the outside is the plated cap 22 which in appearance resembles a gasoline tank cap. It will further be understood that the amount of air deflected to the inside of the trunk compartment 11 as well as the amount of air thrown therefrom may be controlled by the position to which the tube 20 is turned so that a larger or smaller amount of air may be forced into or withdrawn from the compartment. Furthermore, by moving the tube out part way so that the size of the openings 25 is reduced, an additional regulating means is provided.

It is to be understood that numerous changes in details of construction, arrangement and operation may be effected without departing from the spirit of the invention especially as defined in the appended claim.

What I claim is:

In combination with the rear trunk compartment of an automobile provided with an opening in the side thereof, a sleeve mounted in said opening, a flange on said sleeve secured to the trunk panel, securing means for attaching said flange to the trunk panel, inwardly and outwardly extending portions on said sleeve, a straight tube mounted in said sleeve for longitudinal and rotary movement, said tube having a closed outer end and an open inner end, a series of apertures in one side of said tube near the outer end thereof, means for limiting the outward movement of said tube, an annular knurled skirt on the closed end of said tube forming a smooth cap-like surface on the outer end of said tube, and a rubber gasket or escutcheon surrounding the junction of the body panel and said outwardly projecting portion of said sleeve to present a smooth appearance by covering said securing means.

ARCHIEBALD D. BELL, Jr.